United States Patent
Steinhilb et al.

(10) Patent No.: US 12,479,247 B2
(45) Date of Patent: Nov. 25, 2025

(54) TOW HOOK ASSEMBLIES AND VEHICLES INCLUDING SAME

(71) Applicant: Toyota Motor Engineering & Manufacturing North America, Inc., Plano, TX (US)

(72) Inventors: Aaron R. Steinhilb, Milan, MI (US); Haley L. Antoine, Saline, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 577 days.

(21) Appl. No.: 17/964,440

(22) Filed: Oct. 12, 2022

(65) Prior Publication Data

US 2024/0123779 A1    Apr. 18, 2024

(51) Int. Cl.
*B60D 1/24* (2006.01)
*B60D 1/04* (2006.01)

(52) U.S. Cl.
CPC ............... *B60D 1/249* (2013.01); *B60D 1/04* (2013.01)

(58) Field of Classification Search
CPC ........ B60D 1/243; B60D 1/249; B60D 1/565; B60D 1/1675; B60D 1/04; B60D 1/488
USPC ...................................................... 280/446.1
See application file for complete search history.

(56) References Cited

U.S. PATENT DOCUMENTS

| | | | |
|---|---|---|---|
| 6,802,522 B1 | 10/2004 | Park et al. | |
| 6,896,281 B2 | 5/2005 | Lenzen et al. | |
| 7,290,783 B2 * | 11/2007 | Dornbos | B60D 1/244 |
| | | | 280/495 |
| 7,775,546 B2 * | 8/2010 | Asjad | B60D 1/565 |
| | | | 280/498 |
| 10,131,193 B2 | 11/2018 | Degenkolb | |
| 10,179,489 B2 | 1/2019 | Farooq et al. | |
| 10,787,052 B2 | 9/2020 | Shenaq et al. | |
| 2019/0217673 A1 * | 7/2019 | Shenaq | B60D 1/50 |
| 2022/0332157 A1 * | 10/2022 | Barrios Albert | B60D 1/565 |

FOREIGN PATENT DOCUMENTS

| | | | | |
|---|---|---|---|---|
| CN | 105564166 A * | 5/2016 | ............. | B60D 1/243 |
| CN | 114435040 A * | 5/2022 | ............. | B60D 1/243 |
| DE | 102006009675 A1 * | 9/2007 | ............. | B60D 1/143 |
| JP | 2003002136 A * | 1/2003 | ............. | B60D 1/243 |
| KR | 101080724 B1 * | 11/2011 | | |

* cited by examiner

*Primary Examiner* — James A English
(74) *Attorney, Agent, or Firm* — Dinsmore & Shohl LLP

(57) ABSTRACT

A tow hook assembly is detachably mounted to a frame member of a vehicle. The tow hook assembly includes a housing and a tow hook. The housing has a front wall with a front surface and an aperture formed in the front wall. The tow hook at least partially extends through the aperture and is movable between an extended position and a retracted position, in the extend position the tow hook extends farther outward from the housing than in the retracted position. The tow hook is configured to move from the extended position to the retracted position upon application of a force exceeding a first threshold. The housing is configured to disengage from the frame member upon an application of a force exceeding a second threshold greater than the first threshold.

14 Claims, 4 Drawing Sheets

TOW HOOK ASSEMBLIES AND VEHICLES INCLUDING SAME

TECHNICAL FIELD

The present specification generally relates to tow hooks for vehicles and, more specifically, tow hooks that reduce damage during impact.

BACKGROUND

In order to tow a vehicle in the event of an accident, malfunction, loss of gas, being stuck in mud or snow, or the like, tow hooks are provided on specific portions of a frame of the vehicle to tow the vehicle without damage to the vehicle. The tow hooks may be mounted to a front cross-member of the vehicle and extend through an opening formed in a front bumper of the vehicle to project in a vehicle forward direction. Alternatively, tow hooks may be mounted directly to the front bumper of the vehicle.

Tow hooks are typically formed from a rigid material to withstand large forces when being towed and to remain secured to the vehicle itself. As such, the tow hooks may result in damages to the tow hook and other components of the vehicle during collisions.

Accordingly, a need exists for an improved vehicles including a tow hook that reduces likelihood of damage during front end collisions.

SUMMARY

In one embodiment, a tow hook assembly is detachably mounted to a frame member of a vehicle. The tow hook assembly includes a housing and a tow hook. The housing has a front wall with a front surface and an aperture formed in the front wall. The tow hook at least partially extends through the aperture and is movable between an extended position and a retracted position, in the extend position the tow hook extends farther outward from the housing than in the retracted position. The tow hook is configured to move from the extended position to the retracted position upon application of a force exceeding a first threshold. The housing is configured to disengage from the frame member upon an application of a force exceeding a second threshold greater than the first threshold.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
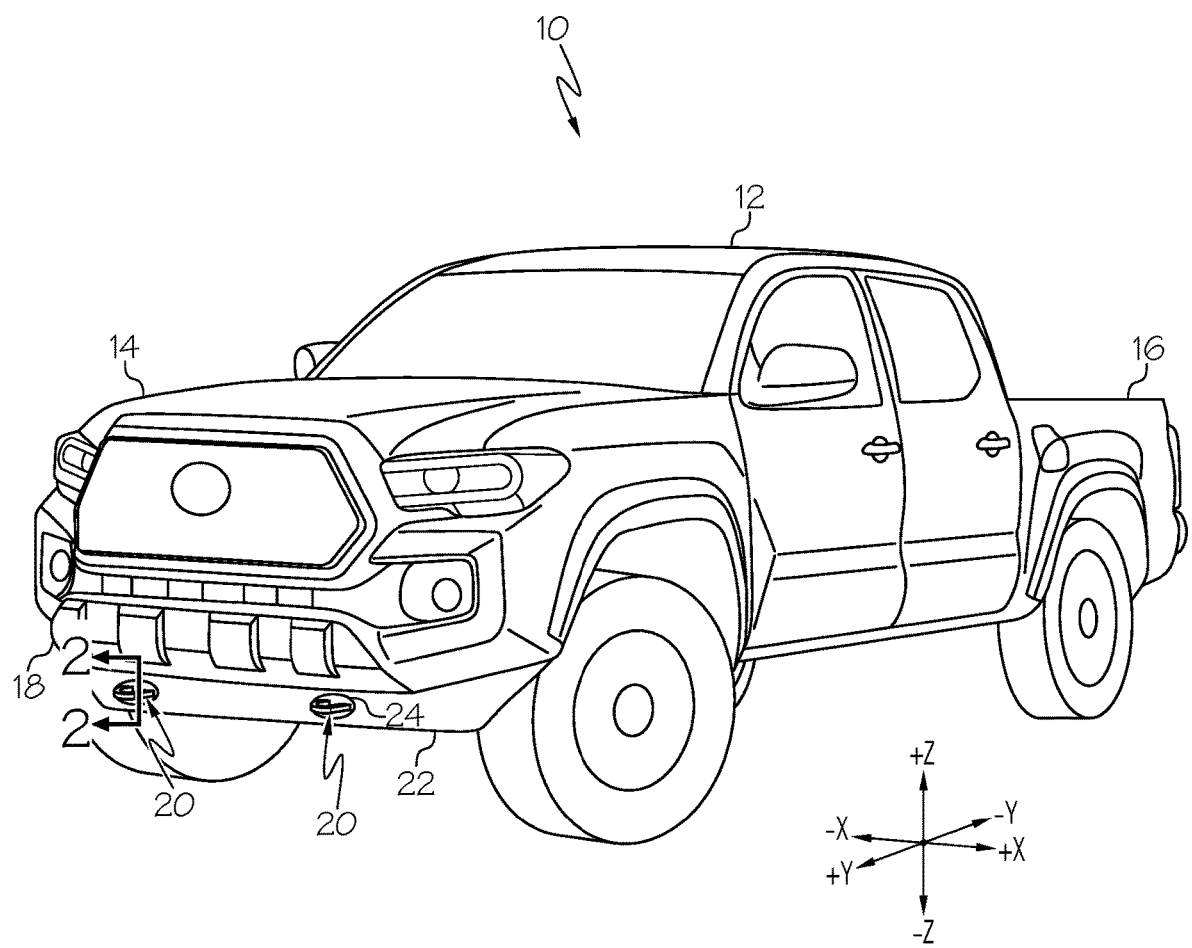
FIG. 1 schematically depicts a perspective view of a vehicle including a pair of tow hooks assemblies, according to one or more embodiments shown and described herein.

Embodiments described herein are directed to vehicles including a movable tow hook that retracts upon a low energy impact to reduces damages while the tow hook also detaches from the vehicle upon a higher energy impact. The vehicles described herein includes a tow hook assembly that is detachably mounted to a frame member of a vehicle. The tow hook assembly includes a housing and a tow hook. The housing has a front wall with a front surface and an aperture formed in the front wall. The tow hook at least partially extends through the aperture and is movable between an extended position and a retracted position, in the extend position the tow hook extends farther outward from the housing than in the retracted position. The tow hook is configured to move from the extended position to the retracted position upon application of a force exceeding a first threshold. The housing is configured to disengage from the frame member upon an application of a force exceeding a second threshold greater than the first threshold. Various embodiments of the vehicle and the operation of the tow hook assembly are described in more detail herein. Whenever possible, the same reference numerals will be used throughout the drawings to refer to the same or like parts.

As used herein, the term "vehicle longitudinal direction" refers to the forward-rearward direction of the vehicle (i.e., in the +/− vehicle Y direction depicted in FIG. 1). The term "vehicle lateral direction" refers to the cross-vehicle direction (i.e., in the +/− vehicle X direction depicted in FIG. 1), and is transverse to the vehicle longitudinal direction. The term "vehicle vertical direction" refers to the upward-downward direction of the vehicle (i.e., in the +/− vehicle Z direction depicted in FIG. 1). As used herein, "upper" and "above" are defined as the positive Z direction of the coordinate axis shown in the drawings. As used herein, "lower" and "below" are defined as the negative Z direction of the coordinate axis shown in the drawings.

Referring to FIG. 1, a vehicle 10 is generally illustrated according to one or more embodiments described herein. As shown, the vehicle 10 is illustrated as a pickup truck. However, the vehicle 10 may be any suitable automobile including coupes, sedans, minivans, crossovers, hybrids, sports utility vehicles, or the like without limiting the scope of the present disclosure. The vehicle 10 includes a body 12 having a front end 14 and a rear end 16 opposite the front end 14, a front bumper 18, and a frame member 22 positioned rearward of the front bumper 18 and provided at the front end 14 of the body 12 of the vehicle 10. The vehicle 10 includes one or more tow hook assemblies 20 located at the front end 14 of the vehicle body 12 of the vehicle 10. For example, as depicted herein, the vehicle 10 includes a pair of tow hook assemblies 20 mounted to extend through an opening 24 in the front bumper 18 at the front end 14 of the vehicle 10. However, it should be appreciated that the vehicle 10 may include any number of tow hook assemblies 20, such as one tow hook assembly 20 or more than two tow hook assemblies 20. In addition, the tow hook assembly 20 may be mounted at any suitable location of the vehicle 10 such as, for example, at the frame member 22 of the front bumper 18 in a position to extend forward beneath the front bumper 18 of the vehicle 10.

Figure 2A:
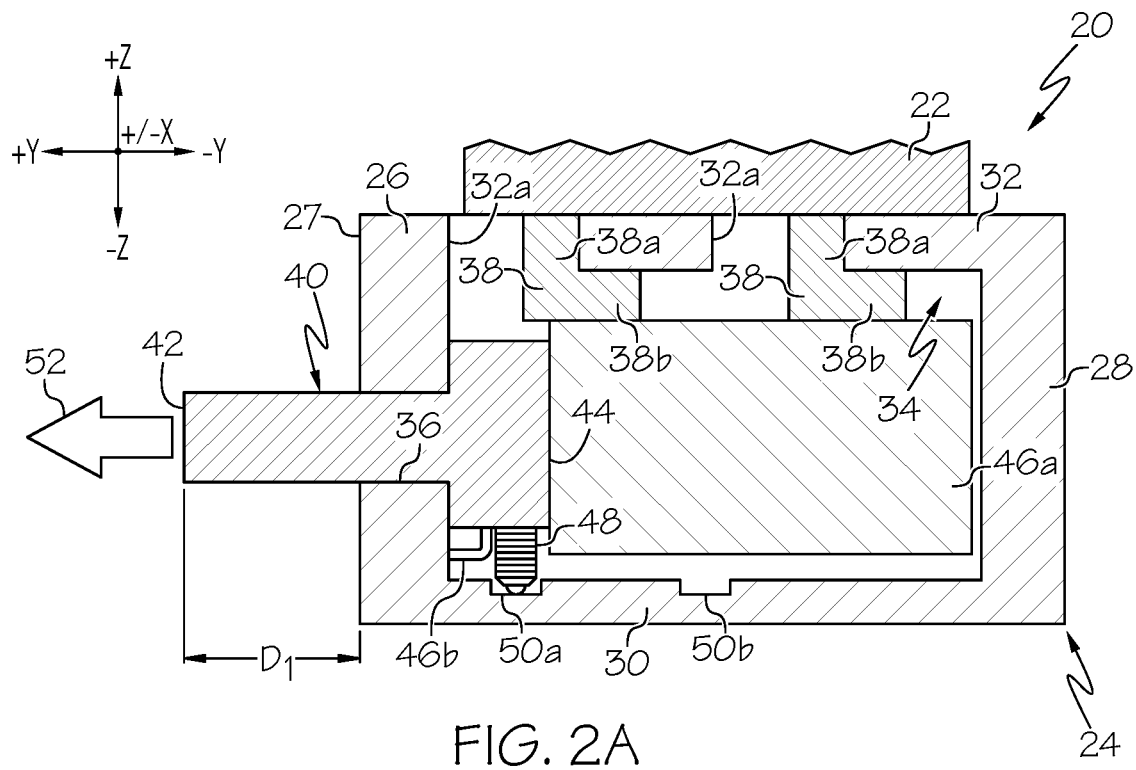
FIG. 2A schematically depicts a cross sectional view of the tow hook assembly taken along line 2-2 in FIG. 1 in an engaged state and a tow hook in a use position, according to one or more embodiments shown and described herein.

Referring now to FIG. 2A, a cross section of the tow hook assembly 20 mounted to the frame member 22 rearward or below the front bumper 18 and taken along line 2-2 of FIG. 1 is shown. In embodiments, the frame member 22 includes one or more flanges 38 extending downward in the vehicle vertical direction (in the −Z direction of the coordinate axes depicted in the drawings). As shown, the frame member 22 may include a pair of flanges 38. However, it should be appreciated that the frame member 22 may include any number of flanges 38 such as, for example, one flange 38 or more than two flanges 38. In embodiments, the flanges 38 include a first flange portion 38a extending in the vehicle vertical direction and a second flange portion 38b extending from an end of the first flange portion 38a rearward in the vehicle longitudinal direction (in the −Y direction of the coordinate axes depicted in the drawings). Accordingly, the flanges 38 may form a substantially L-shape member when viewed in the vehicle lateral direction (in the +/−X direction of the coordinate axes depicted in the drawings).

The tow hook assembly 20 includes a housing 24 and a tow hook 40. The housing 24 includes a front wall 26, a rear wall 28 opposite the front wall 26, a bottom wall 30, an upper wall 32 opposite the bottom wall 30, and a pair of side walls define an interior 34. The upper wall 32 of the housing 24 includes one or more openings 32a formed therein. As shown, the upper wall 32 of the housing 24 includes a pair of openings 32a. However, it should be appreciated that the upper wall 32 may have any number openings 32a formed therein such as, for example, one opening 32a or more than two openings 32a. In particular, it should be appreciated that the number of openings 32a correspond to the number of flanges 38 extending from the frame member 22, as discussed herein. In embodiments, the housing 24 may be open at a rear end thereof and thus not include the rear wall 28. An aperture 36 is formed in the front wall 26 of the housing 24 and has a predetermined shape such as circular, rectangular or other regular or irregular shapes.

The tow hook 40 includes a first end 42 and a second end 44 opposite the first end 42. In embodiments, the second end 44 of the tow hook 40 has a shape that is greater than the shape of the aperture 36. In some embodiments, the aperture 36 has a circular shape having an inner diameter, the second end 44 is has circular shape having an outer diameter that is larger than the inner diameter of the aperture 36. The first end 42 of the tow hook 40 is received within the aperture 36 so as to permit the tow hook 40 to slide within the interior 34 of the housing 24 in the vehicle longitudinal direction. The first end 42 of the tow hook 40 has a shape to allow a component outside the vehicle 10 to latch or hook on the first end 42 of the tow hook 40 in order to apply a force in the direction of arrow 52 and cause the vehicle 10 to move. For example, the first end 42 of the tow hook 40 may be a in a general U shape or a hook shape.

In embodiments, the tow hook assembly 20 includes an energy absorbing member 46a provided within the interior 34 of the housing 24. In embodiments, the energy absorbing member 46a is provided between the rear wall 28 of the housing 24 and the second end 44 of the tow hook 40. The energy absorbing member 46a is a biasing member such as, for example, a spring, a compressible damper, a deformable bracket, a clip, or the like. The energy absorbing member 46a is movable between an expanded position (FIG. 2A) and an compressed position (FIG. 2B) in which application of force by the tow hook 40 against the energy absorbing member 46a causes the energy absorbing member 46a to compress, i.e., reduce a width of the energy absorbing member 46a extending in the vehicle longitudinal direction between the rear wall 28 of the housing 24 and the second end 44 of the tow hook 40.

Figure 2B:
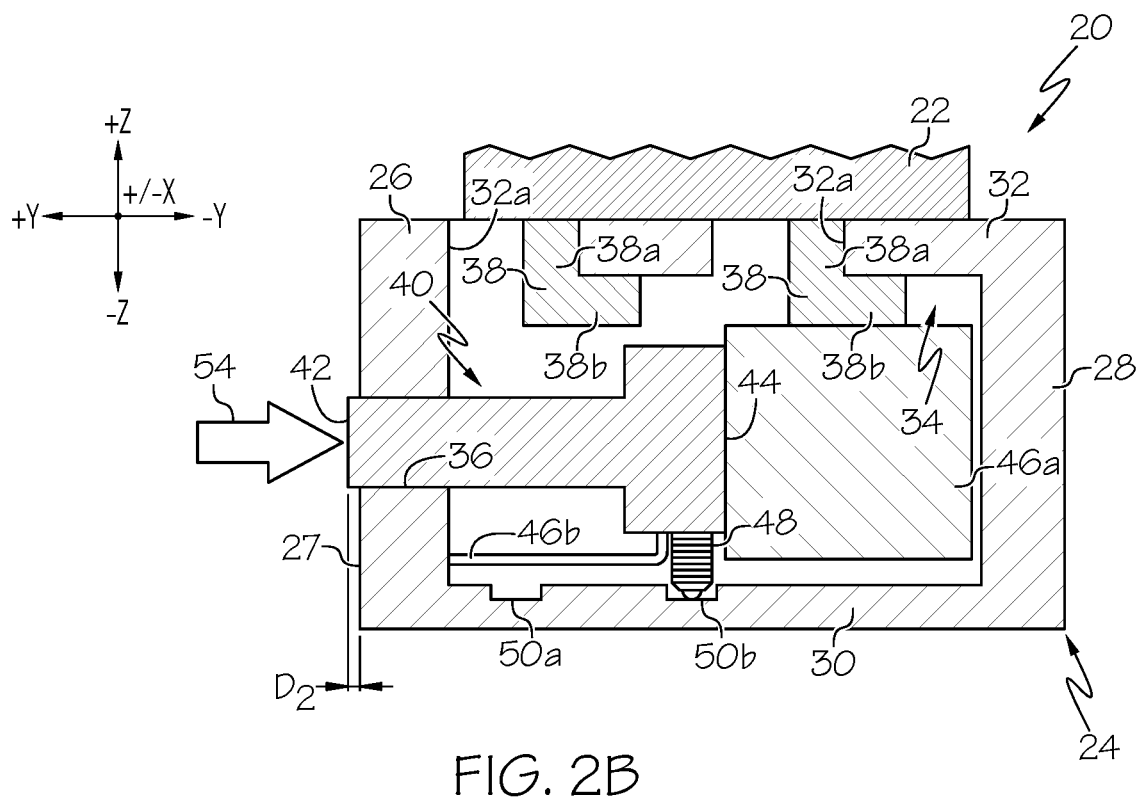
FIG. 2B schematically depicts a cross sectional view of the tow hook assembly in the engaged state and the tow hook in a retracted position, according to one or more embodiments shown and described herein.

In other embodiments, a retention member 46b may be provided to extend from the front wall 26 of the housing 24 to the tow hook 40, proximate the second end 44 of the tow hook 40. In this embodiment, the retention member 46b may be an elastic band, stretchable plastic, retractable device, or the like. As with the energy absorbing member 46a discussed herein, the retention member 46b is movable between a contracted position (FIG. 2A) and an extended position (FIG. 2B).

In embodiments, the bottom wall 30 of the housing 24 includes a front recess 50a and a rear recess 50b formed therein and a spring-loaded ball plunger 48 extends from the tow hook 40 proximate the second end 44 of the tow hook 40 toward the bottom wall 30 of the housing 24. The spring-loaded ball plunger 48 is positionable into the front recess 50a and the rear recess 50b to retain the tow hook 40 in either a use position (FIG. 2A) or a retracted position (FIG. 2B), respectively.

Figure 2C:
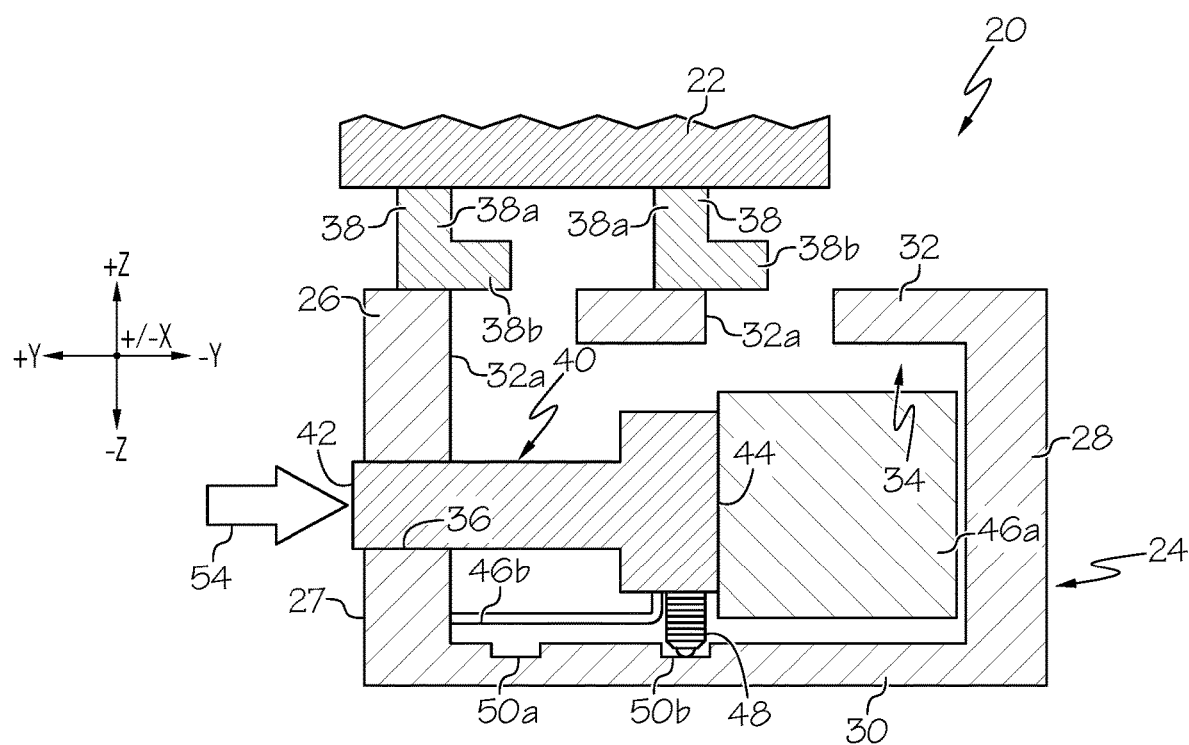
FIG. 2C schematically depicts a cross sectional view of the tow hook assembly in a disengaged state and the tow hook in the retracted position, according to one or more embodiments shown and described herein.

Referring still to FIG. 2A, the tow hook assembly 20 is depicted in an engaged state such that the housing 24 is mounted to the frame member 22 and the tow hook 40 is in an extended position relative to the housing 24. More particularly, as shown, the flanges 38 extending from the frame member 22 are received within corresponding openings 32a formed in the upper wall 32 of the housing 24. The flanges 38 and the upper wall 32 of the housing 24 may be joined together in any suitable manner such as, for example, mechanical fasteners, clips, adhesive, or the like. However, as discussed in more detail herein, it should be appreciated that, upon application of a force exceeding a threshold, the engagement between the flanges 38 and the upper wall 32 of the housing 24 is disengaged to permit the tow hook assembly 20 to disengage from the frame member 22, as shown in FIG. 2C. In embodiments, the threshold may be the force applied when bumping into an object with an average walking speed of 3 miles per hour.

As shown in FIG. 2A, the tow hook 40 is depicted an extended position. In the extended position, the first end 42 of the tow hook 40 extends through the front wall 26 by a first distance D1 in the vehicle longitudinal direction. The first distance D1 is the distance between the first end 42 of the tow hook 40 and a front surface 27 of the front wall 26 of the housing 24 in the extended position. The second end 44 of the tow hook 40 abuts against the front wall 26 of the housing 24. With the tow hook 40 in the extended position, the energy absorbing member 46a is in the biased position to apply a force against the second end 44 of the tow hook 40 in the direction of arrow 52 in the vehicle longitudinal direction. Similarly, in embodiments, in which the retention member 46b is provided, the retention member 46b is shown in the biased position to apply a force in the direction of arrow 52 to draw the tow hook 40 into the extended position.

Moreover, in embodiments in which the spring-loaded ball plunger 48 is provided, the spring-loaded ball plunger 48 is positioned within the front recess 50a when the tow hook 40 is in the extended position. The spring-loaded ball plunger 48 retains the tow hook 40 in the extended position until a force exceeding a threshold is applied to the tow hook 40.

Referring now to FIG. 2B, the tow hook 40 is depicted in the retracted position. In the retracted position, the tow hook 40 is moved rearward in the vehicle longitudinal direction. More particularly, the first end 42 of the tow hook 40 passes through the aperture 36 in the front wall 26 of the housing 24 and the second end 44 of the tow hook 40 moves towards the rear wall 28 of the housing 24. In the retracted position, the first end 42 of the tow hook 40 extends through the front wall 26 of the housing 24 by a second distance D2 which is less than the first distance D1 when in the extended position. The second distance D2 is the distance between the first end 42 of the tow hook 40 and a front surface 27 of the front wall 26 of the housing 24 in the retracted position. With the tow hook 40 in the retracted position, the energy absorbing member 46a is in the unbiased position. Similarly, when provided, the retention member 46b is also in the unbiased position with the tow hook 40 in the retracted position.

In use, the tow hook 40 moves from the extended position to the retracted position upon application of force exceeding a first threshold against the tow hook 40 in the direction of arrow 54 in the vehicle longitudinal direction. In embodiments, the first threshold is 1 kN (kilonewton) ±1%, ±5%, ±10%, ±15%, ±25%, ±50%, ±75%. In embodiments, the energy absorbing member 46a damps a force at which the tow hook 40 moves from the extended position to the retracted position. Similarly, in embodiments in which the retention member 46b is provided, the retention member 46b damps a force at which the tow hook 40 moves from the extended position to the retracted position. Further, in embodiments upon which a spring-loaded ball plunger 48 is provided, upon application of the force exceeding the first threshold, the spring-loaded ball plunger 48 disengages the front recess 50a and re-engages the rear recess 50b, thus retaining the tow hook 40 in the retracted position. In this embodiment, the tow hook 40 may be retained in the retracted position until the spring-loaded ball plunger 48 is reset by the application of a force in the direction of arrow 52 causing the spring-loaded ball plunger 48 to disengage with the rear recess 50b and re-engage with the front recess 50a.

In embodiments, when the force exceeding the first threshold is no longer applied against the tow hook 40 in the direction of arrow 54, the energy absorbing member 46a returns to the biased position (FIG. 2A) to move the tow hook 40 from the retracted position to the extended position. Similarly, in embodiments in which the retention member 46b is provided, the retention member 46b is returned to the biased position (FIG. 2A) to move the tow hook 40 from the retracted position to the extended position.

Referring now to FIG. 2C, the tow hook assembly 20 is depicted in a disengaged position. As discussed herein, upon application of a force against the tow hook 40 in the direction of arrow 54 exceeding a second threshold greater than the first threshold, the joining between the flanges 38 and the upper wall 32 of the housing 24 is severable to permit the tow hook assembly 20 to disengage from the frame member. In embodiments, the second threshold force is over 10 kN (kilonewton) ±1%, ±5%, ±10%, ±15%, ±25%, ±50%, ±75%. In embodiments, the first threshold is 5%, 10,%, 25%, 50%, or 75% of the second threshold ±1%, ±5%, ±10%, ±15%, ±25%, ±50%, ±75%. In doing so, the housing 24 is forced rearward in the vehicle longitudinal direction relative to the front bumper 18 to cause the flanges 38 of the frame member 22 to disengage the upper wall 32 of the housing 24. This results in the tow hook assembly 20 separating from the frame member 22 to prevent interference during crushing of a vehicle frame of the vehicle 10

Figure 3A:
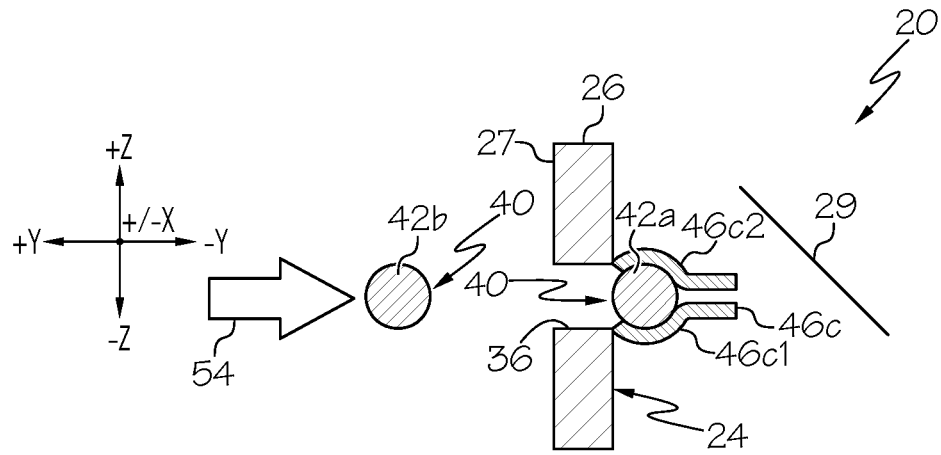
FIG. 3A schematically depicts a cross sectional view of the tow hook assembly in the extended position and engaged with a deformable clip, according to one or more embodiments shown and described herein.
Figure 3B:
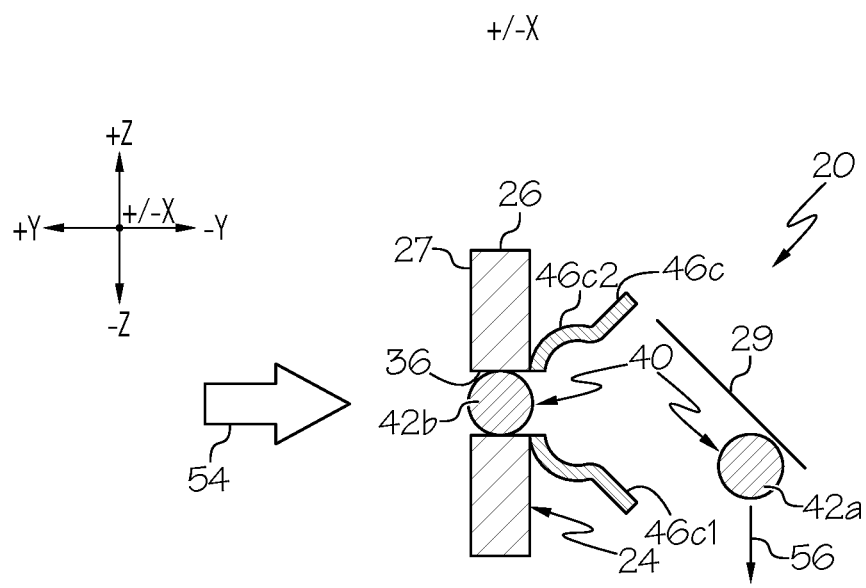
FIG. 3B schematically depicts a cross sectional view of the tow hook assembly in the retracted position and disengaged with the deformable clip, according to one or more embodiments shown and described herein

Referring now to FIGS. 3A and 3B, a side view the tow hook 40 in the extended position and the retracted position, respectively, is depicted. In embodiments, the tow hook assembly 20 includes a deformable clip 46c. The deformable clip 46c includes a pair of flexible arms 46c1, 46c2. With the tow hook 40 in the extended position (FIG. 3A), the flexible arms 46c1, 46c2 of the deformable clip 46c compress around a rear hook portion 42a of the tow hook 40 to retain the tow hook 40 in the extended position. When a force exceeding the first threshold is applied in the direction of arrow 54, the rear hook portion 42a causes the flexible arms 46c1, 46c2 of the deformable clip 46c to separate from one another such that the tow hook 40 disengages the deformable clip 46c and is permitted to move into the retracted position (FIG. 3B). In embodiments, the housing 24 includes an angular interior wall 29 extending at an oblique angle relative to the front wall 26 of the housing 24. Upon a force exceeding the first threshold being applied to a front hook portion 42b of the tow hook 40 in the direction of arrow 54, the rear hook portion 42a of the tow hook 40 is directed in the direction of arrow 56 downward in the vehicle vertical direction by the angular surface of the interior wall 29.

From the above, it is to be appreciated that defined herein is a vehicle with a tow hook wherein the tow hook retracts upon a low energy impacts in order to reduce damages with the tow hook while the tow hook assembly also breaks away from the vehicle upon a higher energy impact.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tow hook assembly detachably mounted to a frame member of a vehicle, the tow hook assembly comprising:
   a housing including a front wall;
   a hook at least partially received within the housing and movable between an extended position and a retracted position, in the extended position the hook extends farther outward from the housing than in the retracted position, the hook configured to move from the extended position to the retracted position upon application of a force exceeding a first threshold; and
   a retention member extending from the front wall of the housing to the hook, the retention member damping a force at which the hook moves from the extended position to the retracted position.

2. The tow hook assembly of claim 1, further comprising an energy absorbing member damping a force at which the hook moves from the extended position to the retracted position, wherein the energy absorbing member is provided between the hook and a rear wall of the housing, the rear wall of the housing being opposite a front wall of the housing.

3. The tow hook assembly of claim 2, wherein the energy absorbing member comprises a spring.

4. The tow hook assembly of claim 1, further comprising a spring-loaded ball plunger extending from the hook and positionable within a recess formed in the housing when the hook is in the extended position, the spring-loaded ball plunger disengaging the recess when the force exceeding the first threshold is applied to the hook.

5. The tow hook assembly of claim 1, further comprising a deformable clip engaging the hook when the hook is in the extended position, the deformable clip disengaging the hook when the force exceeding the first threshold is applied to the hook.

6. The tow hook assembly of claim 1, wherein the hook is a tow hook.

7. The tow hook assembly of claim 6, wherein the housing includes a front wall having a front surface, an aperture formed in the front wall.

8. The tow hook assembly of claim 7, wherein, the tow hook is at least partially extends through the aperture.

9. The tow hook assembly of claim 8, wherein the housing is configured to disengage from the frame member upon an application of a force exceeding a second threshold greater than the first threshold.

10. The tow hook assembly of claim 9, wherein the frame member includes a pair of flanges extending downward in a vehicle vertical direction and removably engaging the housing, the housing disengages from the pair of flanges when the force exceeding the second threshold is applied to the tow hook.

11. The tow hook assembly of claim 1, wherein the retention member comprises an elastic band.

12. The tow hook assembly of claim 11, wherein the tow hook includes a first end and a second end opposite the first end, the first end extending through the aperture, the second end having an outer diameter greater than an inner diameter of the aperture, the second end abutting against the front wall of the housing when the tow hook is in the extended position.

13. The tow hook assembly of claim 12, wherein the first end extends through the aperture at a first distance, the first distance being the distance between the first end of the tow hook and the front surface of the housing when in the extended position, and the first end extends through the aperture at a second distance, the second distance being the distance between the first end of the tow hook and the front surface of the housing when the tow hook is in the retracted position, the first distance being greater than the second distance.

14. The tow hook assembly of claim 13, further comprising a spring-loaded ball plunger extending from the tow hook and positionable within a recess formed in the housing when the tow hook is in the extended position, the spring-loaded ball plunger disengaging the recess when the force exceeding the first threshold is applied to the tow hook.

* * * * *

UNITED STATES PATENT AND TRADEMARK OFFICE
CERTIFICATE OF CORRECTION

PATENT NO. : 12,479,247 B2
APPLICATION NO. : 17/964440
DATED : November 25, 2025
INVENTOR(S) : Aaron R. Steinhilb and Haley L. Antoine Page 1 of 2

It is certified that error appears in the above-identified patent and that said Letters Patent is hereby corrected as shown below:

On the Title Page

Item (73), assignee 2, city, delete "Toyota (JP)" and insert --Toyota-shi Aichi-ken (JP)--, therefor.

In the Specification

In Column 2, Line(s) 16, after "herein", insert --.--.

In Column 2, Line(s) 22, delete "reduces" and insert --reduce--, therefor.

In Column 3, Line(s) 39, after "any number", insert --of--.

In Column 3, Line(s) 54, after "end 44", delete "is".

In Column 3, Line(s) 63, after "may be", delete "a".

In Column 4, Line(s) 50, after "depicted", insert --in--.

In Column 5, Line(s) 65, delete "10,%," and insert --10%,--, therefor.

In Column 6, Line(s) 5, after "vehicle 10", insert --.--.

In Column 6, Line(s) 6, after "side view", insert --of--.

Signed and Sealed this
Thirteenth Day of January, 2026

John A. Squires
*Director of the United States Patent and Trademark Office*

CERTIFICATE OF CORRECTION (continued)
U.S. Pat. No. 12,479,247 B2

In the Claims

In Column 7, Line(s) 15, Claim 8, after "wherein", delete ",".

In Column 7, Line(s) 16, Claim 8, delete "extends" and insert --extended--, therefor.